May 12, 1959
J. TURKEVICH
2,886,515
REFORMING WITH A HETEROPOLY ACID CATALYST
IN THE PRESENCE OF WATER
Filed Dec. 5, 1952
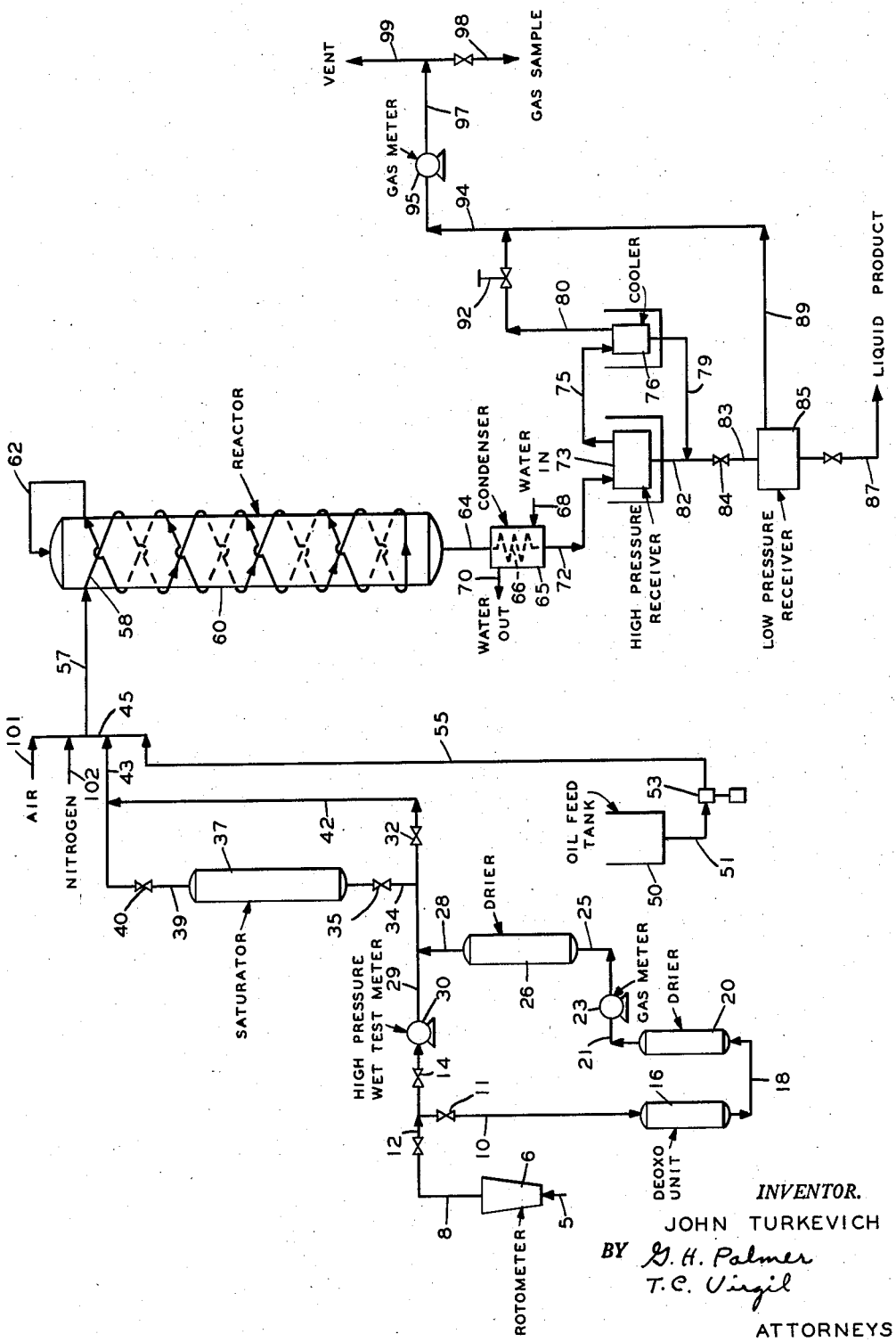
INVENTOR.
JOHN TURKEVICH
BY G. H. Palmer
T. C. Virgil
ATTORNEYS United States Patent Office 2,886,515
Patented May 12, 1959

2,886,515

REFORMING WITH A HETEROPOLY ACID CATALYST IN THE PRESENCE OF WATER

John Turkevich, Princeton, N.J., assignor to The M. W. Kellogg Company, Jersey City, N.J., a corporation of Delaware Application December 5, 1952, Serial No. 324,182

23 Claims. (Cl. 208—134)

This invention relates to an improved reforming process, and more particularly pertains to an improved reforming process for light hydrocarbon oils in which a small amount of water is employed for the reforming reaction.

At present, considerable emphasis is being placed on the fluid hydroforming process in which a molybdenum oxide type of catalyst is employed for commercial application. This process has many advantages over a fixed bed type of operation in which a platinum catalyst is utilized, however, it was found that the molybdena type of catalyst does not produce equivalent yields of reformed liquid product. After careful investigation, it was found that the yields in a fluid hydroforming process employing a molybdena type of catalyst could be improved significantly by employing a small amount of water in the reaction zone. As a result of a careful appraisal of this more recent development, it was determined that a platinum catalyst still gave a higher yield of reformed liquid product on an equivalent octane basis than that obtained with the use of a small amount of water in the fluid hydroforming process. Further investigation has been carried out in an effort to find methods of improving the fluid hydroforming process so as to increase the yields of the high octane product. By means of this invention, it is proposed to employ a different type of catalyst in the reforming operation with a small amount of water in the reaction cycle to obtain significantly higher yields.

In accordance with the present invention, light hydrocarbon oils are reformed by the process which comprises contacting a heteropoly acid catalyst with a light hydrocarbon oil under suitable reforming conditions including the use of a small amount of water.

The heteropoly acid catalyst may be optionally pretreated with a hydrogen containing gas, with or without the use of small amounts of water, at an elevated temperature prior to use in the reforming operation. This treatment can be effected in the presence of a small amount of water, generally, in the amount of about 0.1 to about 15 mol percent based on the quantity of hydrogen employed, more usually, about 0.5 or 1.0 to about 6.0 mol percent of water on the same basis. Under some conditions, it is preferred to employ about 2 to about 6 mol percent of water, based on the hydrogen charged to the pretreating zone. The hydrogen containing gas employed for this purpose can be pure hydrogen or a gas containing hydrogen in the amount of about 35 to about 85% by volume. This pretreatment with a hydrogen containing gas is conducted at an elevated temperature in the range of about 750° to about 1200° F., more usually, about 875° to about 1100° F. In some cases, it is desirable to pretreat at a temperature of about 930° to about 1000° F. At the elevated temperature, the pretreatment can be conducted at atmospheric or superatmospheric pressure, e.g., about 50 to about 1000 p.s.i.g. The rate of hydrogen containing gas employed for this pretreatment is measured on a hydrogen basis, and it involves about 1 to about 400 standard cubic feet of hydrogen per hour per pound of heteropoly acid catalyst, preferably about 2 to about 100 standard cubic feet of hydrogen per hour per pound of heteropoly acid catalyst. The hydrogen is measured on the basis of standard conditions which involve a pressure of 760 mm. and a temperature of 60° F. The reforming process can be practiced as either a fluid or non-fluid operation involving a fixed or moving bed system. Consequently, in the pretreatment of the heteropoly acid catalyst with a hydrogen containing gas, the catalyst can be in the form of lumps, granules, pellets or finely divided particles. In the case of a fluid system, it is contemplated in the pretreatment to employ an upward passage of gaseous materials including hydrogen through a mass of finely divided catalyst at a superficial linear gas velocity of about 0.1 to about 50 feet per second, more usually, about 0.1 to about 6 feet per second, and preferably, on a commercial scale, a superficial linear gas velocity of about 1 to about 2.5 feet per second. The period of treatment may vary considerably depending upon the severity of conditions employed in this operation. Generally, the pretreatment operation is conducted for a period of about 0.05 to about 10 hours, more usually, about 0.2 to about 2 hours. The conditions specified above can be used for a pretreatment involving water as well as one in which the hydrogen containing gas is employed in a substantially anhydrous condition. It should be understood, however, that the pretreatment involving a small amount of water is preferred over the operation involving substantially anhydrous conditions by virtue of the superior results obtained thereby. Usually, the water required for the pretreatment of the catalyst is added with the hydrogen containing gas. This procedure can be varied by injecting the water or vapor thereof into the mass of catalyst after regeneration as a separate stream; or in the case of a moving bed system the steam or water is fed directly into the catalyst stream which is flowing from the regenerator to the pretreating vessel or zone. In some cases, the reducing atmosphere prevailing in the reforming zone is sufficiently effective so that little or no benefits are derived from a separate treatment in order to condition the catalyst.

The physical form of the catalyst involved in the pretreatment operation will be determined by the type of system which is being used for the reforming operation. As previously indicated, the catalyst may be used in the form of lumps, granules, pellets or finely divided material. In a fixed bed system, it is desirable to pretreat the catalyst, after it has been regenerated by means of an oxygen containing gas, without transferring the catalyst from the processing vessel. In effect, the cycles of operation involve a reaction phase, regeneration phase and then a pretreatment phase, with or without suitable purging at appropriate intervals with steam, hydrogen, etc., during the complete operation. In a moving bed system, it is preferred to employ a separate pretreating vessel for the purpose of conditioning the catalyst before use in the reaction zone. This involves transferring the catalyst from the regeneration zone to a pretreating zone, and then circulating catalyst to the reaction zone. The use of a separate vessel for pretreating applies to a fluid or non-fluid system, in either a fixed bed or moving bed operation.

The feed stock to be reformed by means of the present invention is a light hydrocarbon oil and includes, for example, gasoline, naphtha and kerosene. The light hydrocarbon oil can have an initial boiling point of about 85° to about 325° F. and an end point of about 300° to about 500° F. In the case of reforming a naphtha fraction, it is preferred to employ a naphtha having an initial boiling point of about 100° to about 250° F. and an end point of about 350° to about 450° F. Generally, the light hydrocarbon oil to be reformed has a Watson characterization factor of about 11.50 to about 12.20. The feed material can be one which is a straight run or virgin stock, a cracked stock which is derived from a thermal or catalytic cracking operation, or a mixture or a blend of straight run and cracked stocks. Accordingly, the octane number of the feed material can be at least 5 CFRR clear, or more usually, about 20 to about 70 CFRR clear and the olefin content of the oil can vary from about 0 to about 30 mol percent. This light hydrocarbon oil can be derived from any type of crude oil, consequently, it can contain sulfur in the amount of 0 to about 3.0 percent by weight.

The light hydrocarbon oil is reformed under conditions which can involve the net consumption or net production of hydrogen. A system involving the net production of hydrogen is commonly referred to as hydroforming, and it is operated under such conditions that the quantity of hydrogen produced is sufficient to sustain the process without need for extraneous hydrogen. Generally, for the reforming of light hydrocarbon oils, a temperature of about 750° to about 1100° F. is employed. At this temperature, the pressure of the operation is generally maintained at about 25 to about 1000 p.s.i.g. The quantity of oil processed relative to the amount of catalyst employed is measured in terms of the weight space velocity, that is, the pounds of oil feed on an hourly basis charged to the reaction zone per pound of catalyst which is present therein. The weight space velocity can vary from about 0.05 to about 10. The quantity of hydrogen which is added to the process is usually measured in terms of the standard cubic feet of hydrogen (measured at 60° F. and 760 mm.) per barrel of oil feed charged to the reforming operation (1 barrel=42 gallons). On this basis, the hydrogen rate is about 500 to about 20,000 s.c.f.b. Another method of indicating the quantity of hydrogen which can be present during the reforming operation is by means of hydrogen partial pressure. In this regard, the hydrogen partial pressure is about 15 to about 950 p.s.i.a. in the reaction zone, based on inlet conditions.

In a hydroforming operation, the reaction conditions fall within the ranges specified hereinabove, however, they are selected on the basis of obtaining a net production of hydrogen. Accordingly, a preferred hydroforming process involves a temperature of about 850° to about 1050° F.; a pressure of about 50 to about 500 p.s.i.g.; a weight space velocity of about 0.1 to about 3; a hydrogen rate of about 1000 to 7500 s.c.f.b. and a hydrogen partial pressure of at least about 25 p.s.i.g. and up to the point at which hydrogen is consumed.

The reforming of the light hydrocarbon oil is effected with the use of a small amount of water. Apparently, the pretreatment of catalyst with hydrogen containing a small amount of water imparts sufficient desired activity to the catalyst to make possible the production of significantly higher yields of reformed liquid product of high anti-knock quality. Hence, it is preferred in a reforming operation to employ a small amount of water during the operation to insure the production of higher yields of reformed liquid product of high octane quality. Accordingly, it is contemplated reforming light hydrocarbon oils in the presence of about 0.1 to about 10 mol percent of water, preferably about 0.25 to about 5 mol percent of water, based on the amount of hydrogen which is added to the reforming zone. Under some conditions, it is desirable to add about 0.5 to about 2.5 mol percent of water, based on hydrogen. The water employed for this purpose can be added to the hydrogen containing gas stream which is charged to the reaction zone; and/or it can be added in the form of a liquid to the oil feed and/or it can be added directly to the reforming zone. In any manner of addition of the water, it is contemplated measuring the quantity thereof on the basis of the amount of hydrogen which is added to the reforming step.

Due to the reforming operation, the heteropoly acid catalyst becomes contaminated with carbonaceous material which lowers its catalytic activity undesirably. Hence, the catalyst is subjected to a regeneration treatment which involves contacting the same with an oxygen containing gas, e.g., oxygen, air, diluted air having about 1 to about 10% oxygen by volume, etc., at a temperature of about 600° to about 1250° F., preferably about 950° F. to about 1150 F. The regeneration is effected at atmospheric pressure or an elevated pressure of about 25 to about 1000 p.s.i.g. Prior to regeneration, the catalyst usually contains about 0.1 to about 5.0% by weight of carbonaceous material, and due to regeneration the carbonaceous material content is reduced to zero content or up to about 0.5% by weight. It is desirable to remove as much carbonaceous material as is economical, because possibly such material deposited on the catalyst may undesirably tend to cover the active centers of the heteropoly acid, and thus render the catalyst less effective for the reforming operation. In such a case, the ideal situation may be to burn off all the carbonaceous material deposited on the catalyst.

It is preferred to regenerate the catalyst at superatmospheric pressure rather than atmospheric pressure. In this regard, it is preferred to conduct the regeneration step with an oxygen partial pressure of at least about 5 p.s.i.a., usually about 6 to about 200 p.s.i.a. A possible explanation is that severe regeneration conditions effect the more complete removal of deposits which are adverse to catalyst activity.

The reforming operation can be accomplished using a fluid or non-fluid technique, involving either a fixed bed or a moving bed system. In the case of a fixed bed operation, at least two processing vessels are employed in order that while one vessel is undergoing regeneration and/or pretreatment, the other vessel is processing the light hydrocarbon oil to be reformed. In the commercial operations of present day, usually four processing vessels are employed. This is also suitable in the present invention, because it provides for larger quantities of material to be reformed. Normally, in a fixed bed system, the reaction cycle takes about 0.25 to about 8 hours, the regeneration takes about 0.25 to about 8 hours and the pretreating operation can require about 0.1 to about 2.0 hours. In a fluid-moving bed system, the finely divided catalytic material has a particle size in the range of about 0 to about 250 microns, more usually, about 10 to about 100 microns. The mass of finely divided material is fluidized by the upward flow of gaseous or vapor materials therethrough which have a superficial linear velocity of about 0.1 to about 500 feet per second, more usually, about 0.1 to about 6 feet per second. In commercial operations, it is preferred to employ a superficial linear gas velocity of about 0.75 to about 2 feet per second. These linear gas velocities can exist in any of the processing vessels, namely, the reactor, the regenerator, the pretreating vessel and the transfer lines between vessels. Furthermore, the specified linear gas velocities can provide either a lean or dense phase of fluid mass. Usually, it is preferred to employ a dense phase, because it provides a more intimate contact between the gas and/or vapor and the catalyst particles. The relative rates of catalyst being circulated and the oil being charged to the reaction zone is usually termed the catalyst to oil ratio, on a weight basis. Generally, in a moving bed system, the catalyst to oil ratio is about 0.05 to about 20. For commercial operations, it is preferred to employ a catalyst to oil ratio of about 0.5 to about 5.0.

In the practice of this invention, it may be desirable that the heteropoly acid catalyst, whether it is pretreated or pre-reduced under the conditions specified hereinabove or not, be contacted with the oil charge for a period not greater than about 2 hours. In a fixed bed system, this condition is measured as the reaction cycle or period; whereas in a moving bed system, it is the catalyst residence time in the reaction zone. For the purpose of this specification and the appended claims, "catalyst processing time" is intended to mean the length of time catalyst is contacted with oil prior to being regenerated or otherwise discontinued from use, and this factor is measured as the reaction cycle or period in a fixed bed and the catalyst residence time in the reaction zone in a moving bed system. The heteropoly acid which is employed as catalyst in the present invention is one having at least two different acid forming elements united in the acid functional group. One of the acid forming elements is termed, for the purpose of this specification and the appended claims, as the central acid forming element, by reason that, generally, another one or more outer acid forming elements are bound thereto in the ratio of about 3–12 to 1 of outer acid forming element or elements to central acid forming element or elements, more desirably about 12 to 1 on a similar basis. For example, the ratio of outer acid forming element to central acid forming element occurs in four main classes having ratios of 12, 9, 6 and 3 to 1. The same combination of different elements may occur in more than one class. The outer acid forming elements will be regarded as those which are attached to the central acid forming element of the acid forming functional group in predominant number. The central acid forming element is any element which is at least trivalent and is capable of forming an oxygen containing compound which has acidic properties, and/or an analogous thio compound of acidic properties in which all or part of the oxygen atoms are replaced by sulfur. The outer acid forming elements are molybdenum, chromium, tungsten and vanadium. Many of the central acid forming elements can be selected from groups VA and VIA; whereas the outer acid forming elements can be chosen from groups VB and VIB of the periodic table. It is also contemplated employing heteropoly acids in which more than one outer acid forming element is present in the said functional group, as well as more than one central acid forming element is present therein. The central acid forming elements are, for example, phosphorus, germanium, tellurium, arsenic, aluminum, boron, silicon, manganese, cobalt, rhodium, chromium, selenium, iodine, platinum, antimony, etc. Specific examples of the heteropoly acids are, for example, molybdenum acid iodate, $$H_2[I_2O_4(MoO_4)] \cdot 1H_2O$$

molybdenum acid selenite, $3SeO_2 \cdot 10MoO_3 \cdot XH_2O$; molybdenum acid arsenate, $As_2O_5 \cdot 18MoO_3 \cdot 38H_2O$;

$$H_9[M^{III}(MoO_4)_6] \cdot XH_2O$$

wherein X is 1 to 70 and M is a trivalent element selected from Al, Cr, Fe, Co, Mn or Rh; ammonium acid salt of aluminum molybdate, $(NH_4)_3H_6[Al(MoO_4)_6] \cdot 7H_2O$; molybdenum acid titanate, $TiO_2 \cdot 12MoO_3 \cdot 22H_2O$; molybdenum acid germanate, $GeO_2 \cdot 12MoO_3 \cdot 32H_2O$; molybdenum acid vanadate, $V_2O_5 \cdot 8MoO_3 \cdot 5H_2O$; ammonium acid salt of thiovanadate-thiomolybdate, $$(NH_4)_5H_3[H_2(MoS_4)_4(VS_3)_2] \cdot 10H_2O$$

ammonium acid salt of nickelous molybdate, $$(NH_4)_4H_6[Ni(MoO_4)_6] \cdot 5H_2O$$

ammonium acid salt of cupric molybdate, $$(NH_4)_4H_6[Cu(MoO_4)_6] \cdot 5H_2O$$

ammonium salt of ferric molybdate, $$(NH_4)_3H_6[Fe(MoO_4)_6] \cdot 7H_2O$$

ammonium salt of rhodium molybdate, $$(NH_4)_3H_6[Rh(MoO_4)_6] \cdot 7H_2O$$

molybdenum acid platinate, $PtO_2 \cdot 10MoO_3 \cdot XH_2O$; chromium acid iodate, $2CrO_3 \cdot I_2O_5 \cdot 5H_2O$; ammonium acid salt of phosphovanadate, $(NH_4)_5H_2[P(V_2O_6)_6] \cdot 21H_2O$; silicomolybdic acid, $H_4[SiMo_{12}O_{40}] \cdot XH_2O$, wherein X can be 5 to 29; phosphomolybdic acid, $$P_2O_5 \cdot 24MoO_3 \cdot 63H_2O$$

phosphotungstic acid, $P_2O_5 \cdot 24WO_3 \cdot 63H_2O$; silicomolybdic acid, $SiO_2 \cdot 12MoO_3 \cdot 32H_2O$; silicotungstic acid, $$SiO_2 \cdot 12MoO_3 \cdot 32H_2O$$

borotungstic acid, $B_2O_3 \cdot 24WO_3 \cdot 65H_2O$; aluminomolybdic acid, $H_{10}[Al(MoO_4)_6] \cdot 10H_2O$; and periodotungstic acid, $I_2O_7 \cdot 12WO_3 \cdot 11H_2O$. The heteropoly acids can be derived from the corresponding ammonium salts under reaction conditions, consequently, such salts can be used as precursor materials for the purpose of this invention. Furthermore, it should be understood, for the purpose of this specification and the appended claims, that the term "heteropoly acid" is intended to include the use of those materials which will, under reaction conditions, convert to the active acid form. The heteropoly acids are generally in the hydrated form, however, it should be understood that these acids are useful in any state of hydration, although the higher hydrates are more satisfactory by reason that usually such acids contain high ratios of outer acid forming element to central acid forming element.

It was found by means of experimental work that the heteropoly acids are exceptionally better as catalysts for reforming of light hydrocarbon oils, which includes, mainly, dehydrogenation, cyclization and isomerization reactions, when used with a small amount of water in the reforming zone, than molybdenum oxide catalysts under comparable operating conditions. It appears that the high acidity of the heteropoly acids is highly desirable for reforming reactions, however, since the catalyst is employed in the presence of hydrogen or reducing conditions, there is the danger of the catalyst losing its potency, unless some measure is taken to preserve the same. Quite unexpectedly, the use of a small quantity of water produced exceptional reforming results, which appears to lend support to the theory that the water prevents the reducing atmosphere from destroying the heteropoly acid. On the basis of this theory, it appears that the highly basic heteropoly acids, which also tend to be highly hydrated, are excellent catalysts. This property can also be expressed in terms of the ratio of outer acid element to central acid forming element. It is desirable therefore, to employ those heteropoly acids which are at least heptabasic, although the dibasic, tribasic, tetrabasic, pentabasic acids, etc., can be used with varying degrees of effectiveness. Accordingly, those acids having about 0 to about 63 or 70 molecules of water of hydration, more usually, about 3 to about 30 molecules of water of hydration are employed herein. The solubility of heteropoly acids in organic solvents indicates the strong affinity of these compounds for hydrocarbon groups. It should be understood that the above explanation, based on the acidity of the heteropoly acids, is merely advanced as a theory, and I do not intend to be bound thereby.

The heteropoly acid or mixtures thereof can be used alone, or they are supported on carrier materials, such as for example, zinc spinel, alumina, silica, magnesia, titania, zirconia, silica-alumina, alumina-magnesia, alumina-titania, pumice, fuller's earth, kieselguhr, bentonite clays, "Superfiltrol," bauxite, alumina-thoria, charcoal, etc. Any support or carrier material may be useful for the catalyst, provided it does not catalyze the undesired reactions to any great extent. Generally, about .5 to about 50% by weight, preferably about 4 to about 20% by weight, of heteropoly acid or mixtures thereof are employed, based on the total catalyst. It is desirable to add a small amount of silica, i.e., about 0.1 to about 12% by weight, based on the total catalyst, in order to enhance catalyst stability at elevated temperatures, particularly in the case of using alumina as a support. The alumina can be in the gel or activated form as either eta- or gamma-alumina or mixtures of the two.

Alumina is an excellent support material for the catalyst of the present invention. Alumina can be prepared by a variety of methods and all of these are satisfactory for the purposes of this invention. In the preparation of alumina, aluminum; water; an acid, such as for example, formic acid, acetic acid or hydrochloric acid; and mercury or mercuric oxide are reacted under suitable conditions and proportions to produce a hydrous alumina or alumina sol. The alumina sol is then treated with an alkaline reagent, e.g., ammonium hydroxide, in order to effect a gelation. In the treatment of the alumina sol with an alkaline reagent, it is desirable to adjust the pH to a value between about 5 to about 12. The alumina can also be prepared by reacting aluminum, water and mercury or mercuric oxide at an elevated temperature, preferably at the boiling point of the solution. The alumina thus produced then can be optionally treated with an alkaline reagent, e.g., ammonium hydroxide. Another method for preparing alumina is to precipitate alumina gel from an aluminum salt, e.g., aluminum chloride, aluminum sulfate, aluminum nitrate, etc., by means of an alkaline reagent, e.g., ammonium hydroxide. The precipitation is conducted at a pH of between about 3.5 to 7. The gel thus produced can then be further treated with an alkaline reagent, e.g., ammonium hydroxide, with or without aging for a suitable period of time. In all of the preparations of alumina given above, it is also intended that the alumina may be aged, with or without treatment by means of an alkaline reagent, for a period of at least about 10 hours, more usually, at least about 17 hours. The alumina prepared by the methods described above will be either gamma- or eta-alumina or mixtures of the two.

In the preparation of the catalyst, various techniques can be used. The heteropoly acid can be first prepared in accordance with the methods known to those skilled in the art. The heteropoly acid can be dissolved in water and/or an aliphatic alcohol, e.g., methanol, ethanol, butanol, pentanol, etc., and used as a solution for the purpose of mixing with the carrier material. The carrier material can be in the hydrous, dried and/or calcined form prior to admixture with the heteropoly acid. The solid heteropoly acid can be mixed directly with the carrier material, which may or may not contain sufficient water and/or aliphatic alcohol to dissolve and thus disperse the heteropoly acid, and in the event there is insufficient solvent, it can be added to effect such a purpose. The pH of the final mixture may be on the acidic or basic side, provided the catalyst after final treatment, such as calcination, is acidic. Accordingly, prior to calcination, the catalyst may have a pH of about 0.5 to 12. The catalyst mixture after thorough mixing is subjected to a drying operation at a temperature not greater than about 400° F., more usually, about 150° to about 250° F., for a period of about 6 to about 50 hours, more usually, about 10 to about 30 hours. Following drying, it is calcined at a temperature not greater than about 400° F., more usually, about 600° to about 1250° F. In some cases, temperatures as high as 1500° F. may be used, however, care should be taken to avoid decomposing the heteropoly acid. The calcination treatment is conducted for a period of about 1 to about 20 hours, more usually, about 2 to about 8 hours.

Having thus provided a general description of the present invention, reference will be had to the accompanying drawing which illustrates a test unit which was employed for the purpose of evaluating the present invention.

In the accompanying drawing, hydrogen was supplied from source 5 and it passed to a rotameter 6 wherein the rate of hydrogen was measured. The measured hydrogen flowed from the rotameter to a valved line 8 and thereafter it passed to one of two circuits, namely, a circuit involving the removal of oxygen and water from the hydrogen gas stream and the other circuit which by-passed the oxygen removal system going directly to a wet test gas meter. Water was added to either stream of hydrogen gas in the desired quantity. When it is desired to produce dry hydrogen, the hydrogen flowed into line 10 which contained a valve 11 in an open position. The processing of the hydrogen through the other circuit involved passing the hydrogen through a line 12 which contained a valve 14. The hydrogen in line 10 flowed into a Deoxo unit 16 comprised of palladium on aluminum oxide wherein oxygen removal was effected. Following the deoxygenation step in vessel 16, the hydrogen passed from the bottom thereof into a line 18 which was connected to the bottom end of a dryer 20 having present therein anhydrous calcium sulfate for the removal of moisture in the hydrogen gas. The dried hydrogen gas passed overhead from dryer 20 into an overhead line 21 and then it was measured by means of a wet test gas meter 23. A hydrocarbon mixture similar to the charge naphtha was used in the wet test meter instead of water. Since the hydrogen gas might absorb a small amount of water which might be present in the hydrocarbon mixture in the gas meter, it was passed through a line 25 which was connected to a second dryer 26 containing anhydrous calcium sulfate for the removal of water. The hydrogen gas stream was discharged from the top of dryer 26 through a line 28 which joined with a line 29. The deoxygenated gas was then passed through line 34 to the water saturator 37, where the desired concentration of water vapor was supplied. If no water was desired, the dry deoxygenated hydrogen by-passed the saturator through line 42.

In the event that it was desired to incorporate a predetermined quantity of water vapor into the hydrogen gas stream, without removing traces of oxygen beforehand, valve 11 in line 10 was kept in a closed position and valve 14 in line 12 was left open. In this case, the measured hydrogen from rotameter 6 was first measured in a high pressure wet test gas meter 30. The measured hydrogen gas stream flowed first through line 29 in which there was situated a valve 32. In this type of an operation, valve 32 was maintained in a closed position and the hydrogen gas stream flowed through a line 34 in which there was installed a valve 35 in an open position. The hydrogen gas stream then passed into the bottom of saturator 37 which contained water and was surrounded by an electric jacket to maintain the temperature at a desired level for obtaining the appropriate quantity of water vapor in the hydrogen gas stream. The moisture laden hydrogen gas passed overhead from saturator 37 into a line 39 in which there was installed a valve 40 in an open position. When a dry gas was employed for the pretreating operation, valves 35 and 40 were maintained closed in order to avoid moisture from getting into the hydrogen gas. Likewise, in such an operation, valve 32 in line 29 was kept open in order that the hydrogen gas by-passed saturator 37 by means of a line 42. The hydrogen containing gas then flowed through a line 43 which was connected to a main header 45 by which processing materials were charged to the reaction zone containing the catalytic material.

During the reaction cycle, the oil being processed was supplied from an oil feed tank 50 through a line 51 connected to the bottom thereof and thence transported by means of pump 53 through a line 55 which was connected to the main header 45. The mixture of hydrogen containing gas and oil flowed from header 45 into a line 57 which was connected to a coil 58 surrounding the reactor vessel 60. The coil 58 was wound downwardly across the length of the reactor for a coil length distance of 10 feet, and then upwardly across the same area of the reactor before entering the top of the reactor as line 62.

The reactor was a cylindrical vessel having an internal diameter of 1.5 inches and a length of 1.5 feet. The catalytic material, being present in the form of 3/16 inch pellets, occupied 550 cc. of the reactor capacity. The reactant materials flowed downwardly over the catalytic material and thence passed from the reaction zone through a bottom line 64 which was connected to a condenser 65. The reaction product passed through an internal coil 66 which was surrounded by cooling water introduced via line 68 and then leaving the condenser via line 70. The condensed liquid product flowed from the bottom of the condenser through a line 72 which was connected to the top of a high pressure receiver 73. Any gaseous material which was combined with the liquid product passed from receiver 73 into an overhead line 75 which was connected to a secondary cooler 76. In the secondary cooler any gaseous material which was condensable accumulated therein and was removed from the bottom thereof through a line 79. The normally gaseous material in the secondary cooler 76 passed overhead through a line 80. The liquid product in the high pressure receiver 73 was discharged through the bottom thereof by means of a line 82 and then it combined with the liquid product flowing through line 79 in line 83 in which there was installed a valve 84 for the purpose of maintaining the desired high pressure within receiver 73. The combined liquid product in line 83 flowed in to a low pressure receiver 85. The liquid product was then discharged from receiver 85 through a bottom valved line 87. Any gaseous material which was present with the liquid product was removed from the top of receiver 85 and it flowed through a line 89. The normally gaseous product from the secondary cooler 76 is passed through a pressure control valve 92 which is installed in the overhead line 80. The normally gaseous products in lines 80 and 89 were combined in line 94 before passing through a gas meter 95. The measured gaseous product then flowed through line 97 before a portion thereof was taken as a gas sample through a valved line 98 and the remainder was vented through a line 99.

The temperature of the reaction zone was maintained by submerging the reactor with coil 58 into a molten lead bath maintained at a desired temperature. The molten lead bath is not shown in the schematic diagram. After the reaction cycle had run for the prescribed period of time, the catalytic material was regenerated by employing a regeneration gas constituting a mixture of nitrogen and air. In the case of regeneration at atmospheric pressure, air was introduced through a line 101 and nitrogen was supplied through a line 102, and both of these lines were connected to the main header 45, from which the material passed into line 57 prior to flowing through coil 58 circumscribing the reaction vessel. Following the reaction cycle, the stream of nitrogen was passed through the reactor in order to remove as much of the reaction product wetting the catalyst as was possible. This was carried out at a temperature of about 875° to about 1050° F. and for a period of 45 minutes. Following the purging cycle, air was introduced along with the nitrogen in a quantity appropriate to obtain 2% by volume of oxygen. The temperature of the catalyst during this cycle of the operation was maintained at about 950° to about 1100° F. The concentration of air was increased during the regeneration until the oxygen concentration was about 8% by volume. The concentration of air was controlled at the lower concentrations to prevent the temperature from exceeding 1150° F. When it appeared that all combustible materials had been removed, the catalyst was treated with 10% air for one-half hour.

The catalyst employed in the following experiments was prepared by the following method.

CATALYST I

The following reactants were charged to a 20 gallon wooden barrel in the order listed below:

1000 grams of new aluminum pellets,
4000 grams of used aluminum pellets,
10 liters of distilled water and
100 cc. of mercury.

A 1/4 H.P. Easter mixer with a 6 inch three blade propeller was used for agitation. Glacial acetic acid, Merck reagent, was added continuously (1.3 cc./min.) from a buret, and steam was introduced for 4 minutes as shown in the following table:

| Time (min.) | $CH_3COOH$ (cc.) | pH at ° C. | Notes |
|---|---|---|---|
| 0 | 0 | | Steam in 4 min. |
| 5 | 6.5 | | |
| 10 | 13 | 4.62—30° C. | |
| 15 | 19.5 | | |
| 20 | 26 | 5.24—27° C. | |
| 30 | 39 | 5.58—25° C. | |
| 35 | 45.5 | | |
| 40 | 52 | 5.80—24° C. | |
| 45 | 58.5 | | |
| 50 | 65 | 5.82—27° C. | |
| 55 | 72.5 | | |
| 60 | 78 | 5.92—32° C. | Aluminum very reactive. |

The weight of the product obtained was 10,706 grams. Since an ignition loss gave 95% solids, 1025 grams of $Al_2O_3$ were calculated to be present. The density was 1.047 grams per cc. at 65° C. While stirring, 208 grams of ethyl orthosilicate, $Si(C_2H_5O)_4$, (59.2 grams $SiO_2$) were added. The pH was 6.12 at 28° C. When the stirring was stopped, the $Si(C_2H_5O)_4$ came to the surface. Agitation was continued and 25 cc. of concentrated ammonium hydroxide were added causing the slurry to gel to a solid state. After diluting with 2 liters of water, the pH was 7.52 at 28° C., and the slurry was still thick. Another 10 cc. of $NH_4OH$ and 2 liters of water caused the pH to rise to 7.78 at 28° C. Since the slurry was still thick, the addition of 2 more liters of water permitted easier stirring. The pH was 7.60 at 32° C. A final 15 cc. of the base was added, followed by 1 liter of water giving a pH of 8.10 at 32° C.

The product was spray dried in the Niro unit at inlet and outlet temperatures of 395° C. and 112° C., respectively. The feed rate was 83 cc. per minute, and the atomizer pressure was 5.2 kg./cm.². The weight of the spray dried material was 1153 grams. The powder was transferred to two quartz trays and calcined 6 hours at 1470° F. in both the Cooley and Hoskins furnaces. The calcined powder was combined and mixed. The weight was 601 grams. X-ray reported eta- and gamma-$Al_2O_3$.

Phospho molybdic acid, $H_3PO_4 \cdot 12MoO_3 \cdot XH_2O$, was prepared according to the procedure of Linz, I. and E. Ch., Anal. Ed. 15, 459 (1952). Exactly 1992 grams of the vacuum dried product were obtained. An analysis gave 1.4% P, 55.6% Mo. The atomic ratio of outer acid forming element to central acid forming element was 12.07, and the equivalent weight was 597.

Five hundred grams of the calcined powder placed in an evaporating dish were impregnated with 59.5 grams of $H_3PO_4 \cdot 12MoO_3 \cdot XH_2O$, (49.5 grams $MoO_3$), dissolved in 1 liter of water. The solution which had been heated, was cloudy and yellow. An additional 140 cc. of water were used to wet the alumina thoroughly. The catalyst was placed in the Elconap oven where it remained for 23 hours at 225° F.

The material dried into a large, soft, white cake which was easily powdered. It was passed through a 20 mesh screen to remove soft lumps, and transferred to a quartz tray and calcined 3 hours at 1000° F. in the Hoskins furnace. White pills, measuring 3/16 inch in diameter, were prepared, and a 550 cc. test unit charge weighed 291 grams. A chemical analysis of the finished catalyst gave 8.95% $MoO_3$, 4.52% $SiO_2$, 0.15% P and X-ray reported eta- and gamma-$Al_2O_3$.

Another catalyst was employed in this evaluation, for the purpose of determining the effectiveness of Catalyst I.

on a comparative basis, and this catalyst is designated as No. II. Catalyst II was prepared by conventional means and it contained 9.3% of $MoO_3$, 3.6% of $SiO_2$, 0.4% chloride ion and the remainder is alumina.

The feed stocks evaluated by means of this invention are given in Table I below.

*Table I*

| Feed Designation | A | B | C | D |
|---|---|---|---|---|
| °API Gravity | 51.3 | 52.8 | 52.2 | 53.1 |
| ASTM Distillation, °F.: | | | | |
| IBP | 236 | 239 | 228 | 216 |
| 5 | 267 | 283 | 240 | 234 |
| 10 | 275 | 293 | 242 | 241 |
| 20 | 291 | 298 | 248 | 250 |
| 30 | 303 | 309 | 255 | 260 |
| 40 | 315 | 316 | 262 | 274 |
| 50 | 326 | 323 | 271 | 290 |
| 60 | 338 | 330 | 282 | 308 |
| 70 | 349 | 337 | 295 | 324 |
| 80 | 364 | 346 | 312 | 343 |
| 90 | 385 | 360 | 336 | 366 |
| 95 | 404 | 373 | 355 | 382 |
| E.P. | 426 | 387 | 385 | 412 |
| Reid Vapor Pressure, p.s.i. | 0.58 | 0.55 | .22 | 0.68 |
| K-Characterization Factor | 11.89 | 11.99 | 11.71 | 11.84 |
| Refractive Index, $n_D^{68}$ | | | 1.4239 | |
| Aniline Point, °F. | 140 | 134 | 129 | 127 |
| Octane No. CFRR clear | 27.6 | 25.9 | 45.1 | 45.1 |
| Aromatics, Vol. percent (ASTM) | 9.0 | 14.9 | 11.5 | 8.9 |
| Olefins, Mol percent | 1.0 | 1.1 | 1.7 | 10.0 |
| Sulfur, Wt. percent | 0.05 | 0.104 | 0.06 | 0.14 |
| Molecular Weight | 134 | 135 | 117 | 123 |

In the following experiments, the test unit described in the drawing was brought on stream, following regeneration, in the following manner:

(a) The catalyst was regenerated with air and nitrogen at 950° F.

(b) The catalyst was flushed with air for 30 minutes at 1050° F. and atmospheric pressure.

(c) The catalyst bed was flushed with nitrogen for 15 minutes at 940° F. and atmospheric pressure.

(d) Hydrogen containing 0.5 mol percent of water was introduced at atmospheric pressure and at the rate of 30 standard cubic feet per hour. The pressure was allowed to build up to 250 p.s.i.g. and it took about 3 minutes to effect this pressure level. During this stage, the temperature of the catalyst bed increased.

(e) A static pressure of 250 p.s.i.g. of wet hydrogen was maintained for 30 minutes.

(f) The hydrogen containing 0.5 mol percent of water was passed over the catalyst at the rate of 11.0 standard cubic feet per hour for 45 minutes.

Steps (d), (e) and (f) were conducted at a temperature of about 930° F. on the average.

(g) Oil was charged with wet hydrogen flowing to the reactor.

The data obtained in the test unit is reported in Table II below.

catalyst on four different feed stocks. By these comparisons, it is clear that a heteropoly acid is unexpectedly superior over a molybdena catalyst regardless of the type of feed stock used. This is evident from the yields reported at a 95 CFRR clear rating. During the initial runs which utilized fresh catalyst, the catalyst did not show high activity until it was employed under reaction conditions for several hours.

Having thus described the present invention by reference to specific examples thereof, it should be understood that no undue limitations or restrictions should be imposed by reason thereof, but that the scope of the invention is defined by the appended claims.

I claim:

1. A process which comprises treating a heteropoly acid catalyst with a hydrogen containing gas, in the presence of about 0.1 to about 15 mol percent of water based on the quantity of hydrogen, at a temperature of about 750° to about 1200° F., and thereafter contacting the treated catalyst with a light hydrocarbon oil, in the presence of about 0.50 to about 2.5 mol percent of water, and under suitable reforming conditions.

2. A process which comprises treating a heteropoly acid catalyst with a hydrogen containing gas, in the presence of about 0.5 to about 6 mol percent of water based on the quantity of hydrogen, at a temperature of about 875° to about 1100° F., and thereafter contacting the treated catalyst with a light hydrocarbon oil, in the presence of about 0.50 to about 2.5 mol percent of water, and under suitable reforming conditions.

3. A process which comprises treating a heteropoly acid catalyst with a hydrogen containing gas, in the presence of about 0.5 to about 6 mol percent of added water based on the quantity of hydrogen, at a temperature of about 875° to about 1100° F., and thereafter contacting the treated catalyst with a light hydrocarbon oil, in the presence of about 0.2 to about 5 mol percent of water, at a temperature of about 750° to about 1100° F., a total pressure of 25 to about 1000 p.s.i.g., a weight space velocity of about 0.5 to about 10, and in the presence of added hydrogen in the amount of about 500 to about 20,000 s.c.f.b.

4. A process for increasing the yield of liquid product of high anti-knock quality produced in a reforming treatment of a light hydrocarbon oil which comprises contacting said oil with a heteropoly acid catalyst under suitable reforming conditions including added hydrogen and in the presence of about 0.1 to about 15 mole percent of water based on the quantity of added hydrogen.

5. The process in claim 4 in which the central acid forming element of the heteropoly acid catalyst is molybdenum.

6. The process in claim 4 in which the central acid

*Table II*

| Run No. | 1 | 2 | 3 | 4 | 5 | 6 | 7 | 8 |
|---|---|---|---|---|---|---|---|---|
| Catalyst | I | II | I | II | I | II | I | II |
| Feed | A | A | B | B | C | C | D | D |
| Operating Conditions: | | | | | | | | |
| Temperature, °F. | 930 | 930 | 930 | 930 | 930 | 930 | 900 | 900 |
| Pressure, p.s.i.g. | 250 | 250 | 250 | 250 | 250 | 250 | 250 | 250 |
| Space Velocity, $W_o/hr./W_o$ | 1.0 | 0.5 | 0.5 | 0.5 | 1.0 | 1.0 | 1.0 | 0.8 |
| $H_2$ rate, s.c.f.b. | 5,000 | 5,000 | 5,000 | 5,000 | 5,000 | 5,000 | 5,000 | 5,000 |
| Oil Rate, gm./hr. | 244 | 270 | 122 | 270 | 244 | 540 | 244 | 432 |
| Catalyst, grams | 244 | 540 | 244 | 540 | 244 | 540 | 244 | 540 |
| Mol Percent $H_2O$ (basis $H_2$) | 0.5 | 0.5 | 0.5 | 0.5 | 0.5 | 0.5 | 0.5 | 0.5 |
| Period of run, hrs. | 2 | 2 | 2 | 2 | 2 | 2 | 2 | 2 |
| Yields (Output Basis): | | | | | | | | |
| Liquid yield (100% $C_4$) Vol. Percent | 86.1 | 83.1 | 84.9 | 87.5 | 88.1 | 88.4 | 87.6 | 92.3 |
| $C_4$ free Liquid, Vol. Percent | 81.2 | 72.7 | 80.6 | 80.2 | 80.9 | 82.4 | 82.4 | 89.1 |
| Butanes, Vol Percent | 4.9 | 10.4 | 4.3 | 7.3 | 7.2 | 6.0 | 5.2 | 3.2 |
| Dry Gas, Wt. Percent | 11.5 | 15.8 | 13.1 | 11.6 | 10.4 | 9.6 | 10.4 | 6.2 |
| Inspections: | | | | | | | | |
| Octane No. CFRR clear, $C_4$ free Gasoline | 95.2 | 95.4 | 97.9 | 90.0 | 97.3 | 90.2 | 92.6 | 76.5 |
| Yield of $C_4$ free Gasoline of 95 O.N. (CFRR clear) | 81.4 | 73.2 | 83.0 | 71.0 | 82.9 | 77.7 | 80.2 | 73.2 |

In Table II above, four comparisons are made, between a heteropoly acid catalyst and molybdenum oxide forming element of the heteropoly acid catalyst is chromium.

7. The process in claim 4 in which the central acid forming element of the heteropoly acid catalyst is vanadium.

8. The process in claim 4 in which the central acid forming element of the heteropoly acid catalyst is tungsten.

9. The process in claim 4 in which the outer acid forming element of the heteropoly acid catalyst is selected from the group consisting of phosphorus, germanium, tellurium, arsenic, alumina, boron, silica, manganese, iron, cobalt, rhodium, chromium, selenium, iodine, platinum and antimony.

10. The process in claim 4 in which the central acid forming element of the heteropoly acid catalyst is molybdenum and the outer acid forming element is phosphorus.

11. A process for increasing the yield of liquid product of high anti-knock quality in a reforming treatment of a naphtha fraction which comprises contacting said naphtha fraction with phosphomolybdic acid under suitable reforming conditions including added hydrogen and in the presence of about 0.1 to about 15 mole percent of water based on the quantity of added hydrogen.

12. A process for increasing the yield of liquid product of high anti-knock quality produced in a reforming treatment of a light hydrocarbon oil which comprises contacting said oil with a heteropoly acid catalyst under suitable reforming conditions including added hydrogen and about 0.1 to about 10 mol percent of water based on the quantity of added hydrogen.

13. A process for increasing the yield of liquid product of high anti-knock quality produced in a reforming treatment of a light hydrocarbon oil which comprises contacting said oil with a heteropoly acid catalyst under suitable reforming conditions including added hydrogen and about 0.25 to about 5 mol percent of water based on the quantity of added hydrogen.

14. A process for increasing the yield of liquid product of high anti-knock quality produced in a reforming treatment of a light hydrocarbon oil which comprises contacting said oil with a heteropoly acid catalyst under suitable reforming conditions including added hydrogen and about 0.5 to about 2.5 mol percent of water based on the quantity of added hydrogen.

15. A process for increasing the yield of liquid product of high anti-knock quality produced in a reforming treatment of a light hydrocarbon oil which comprises pretreating a heteropoly acid catalyst with hydrogen containing between about 0.1 and about 15 mol percent water at a temperature between about 750° F. and 1200° F. for a period of between about 0.05 and about 10 hours and contacting said light hydrocarbon oil with said pretreated catalyst under suitable reforming conditions, including added hydrogen and in the presence of between about 0.1 and about 10 mole percent of water based on the quantity of added hydrogen.

16. The process in claim 15 in which the central acid forming element of the heteropoly acid catalyst is chromium.

17. The process in claim 15 in which the central acid forming element of the heteropoly acid catalyst is tungsten.

18. The process in claim 15 in which the outer acid forming element of heteropoly acid catalyst is selected from the group consisting of phosphorus, germanium, tellurium, arsenic, alumina, boron, silica, manganese, cobalt, iron, rhodium, chromium, selenium, iodine, platinum and antimony.

19. The process in claim 15 in which the central acid forming element of the heteropoly acid catalyst is molybdenum and the outer acid forming element is phosphorus.

20. A process for increasing the yield of liquid product of high anti-knock quality in a reforming treatment of a naphtha fraction which comprises pretreating a phosphomolybdic acid catalyst with hydrogen containing between about 0.1 and about 15 mol percent water at a temperature between about 750° F. and 1200° F. for a period of between about 0.05 and about 10 hours and contacting said naphtha fraction with said pretreated catalyst under suitable reforming conditions, including added hydrogen and about 0.25 to about 5 mol percent of water based on the quantity of added hydrogen.

21. A process which comprises contacting a light hydrocarbon oil with a heteropoly acid catalyst, in the presence of about 0.1 to about 15 mole percent of water, and under suitable reforming conditions.

22. A process which comprises contacting a light hydrocarbon oil with a heteropoly acid catalyst, in the presence of about 0.1 to about 10 mole percent of water, and under suitable reforming conditions.

23. A process which comprises contacting a light hydrocarbon oil with a heteropoly acid catalyst, in the presence of about 0.25 to about 5 mole percent of water, and under suitable reforming conditions.

References Cited in the file of this patent

UNITED STATES PATENTS

| | | |
|---|---|---|
| 2,131,089 | Beek et al. | Sept. 27, 1938 |
| 2,433,603 | Danner et al. | Dec. 30, 1947 |
| 2,547,380 | Fleck | Apr. 3, 1951 |
| 2,608,534 | Fleck | Aug. 26, 1952 |
| 2,642,383 | Berger et al. | June 16, 1953 |
| 2,642,385 | Berger et al. | June 16, 1953 |
| 2,661,320 | Beckberger et al. | Dec. 1, 1953 |
| 2,768,933 | Burton et al. | Oct. 30, 1956 |